United States Patent
Chou et al.

(10) Patent No.: US 9,090,997 B2
(45) Date of Patent: *Jul. 28, 2015

(54) FABRICATION OF NATURAL CELLULOSE FIBER WITH FLAME-RETARDING CAPABILITY

(75) Inventors: Wen-Tung Chou, Changhua County (TW); Ming-Yi Lai, Changhua County (TW); Kun-Shan Huang, Tainan (TW)

(73) Assignee: ACELON CHEMICAL AND FIBER CORPORATION, Changhua County (TW)

( * ) Notice: Subject to any disclaimer, the term of this patent is extended or adjusted under 35 U.S.C. 154(b) by 668 days.

This patent is subject to a terminal disclaimer.

(21) Appl. No.: 13/411,775

(22) Filed: Mar. 5, 2012

(65) Prior Publication Data

US 2013/0228949 A1    Sep. 5, 2013

(51) Int. Cl.

| D01D 5/06 | (2006.01) |
|---|---|
| D01F 2/00 | (2006.01) |
| D01D 10/02 | (2006.01) |
| D01D 7/00 | (2006.01) |
| D01F 2/02 | (2006.01) |
| D01D 10/06 | (2006.01) |
| D01D 5/26 | (2006.01) |
| D01F 1/07 | (2006.01) |
| D06M 13/282 | (2006.01) |
| D01F 13/02 | (2006.01) |

(52) U.S. Cl.
CPC .. *D01F 2/00* (2013.01); *D01D 5/26* (2013.01); *D01D 7/00* (2013.01); *D01D 10/02* (2013.01); *D01D 10/06* (2013.01); *D01F 1/07* (2013.01); *D01F 2/02* (2013.01); *D01F 13/02* (2013.01); *D06M 13/282* (2013.01)

(58) Field of Classification Search
CPC ............. D01D 5/06; D01D 5/26; D01D 7/00; D01D 10/02; D01D 10/06; D01F 1/07; D01F 2/02; D01F 13/02; D06M 13/282
USPC .......... 264/37.24, 101, 143, 178 F, 187, 203, 264/211, 211.12, 211.14, 211.15, 211.16, 264/211.17, 233, 234
See application file for complete search history.

(56) References Cited

U.S. PATENT DOCUMENTS

| 4,257,221 A | 3/1981 | Feinberg |
|---|---|---|
| 4,466,990 A | 8/1984 | Sakurada et al. |

(Continued)

FOREIGN PATENT DOCUMENTS

CN    102127842 A    *    7/2011

*Primary Examiner* — Leo B Tentoni
(74) *Attorney, Agent, or Firm* — Bacon & Thomas, PLLC (57) ABSTRACT

A fabrication of natural cellulose fiber with flame-retarding capability comprises following steps. Blend pulp and solvent of N-methylmorpholine N-oxide (NMMO) to form slurry. Evaporate extra water content from slurry by a Thin Film Evaporator (TFE) to form dope. By Dry-Jet Wet Spinning, spin and extrude dope for coagulating and regenerating. Water-rinse and dry to form natural cellulose fiber. Soaking roll natural cellulose fiber by flame retardant of N-(hydroxymethyl)-3-(methoxy phosphorus acyl). Orderly dry, bake, neutralize, soaping clean, water rinse, baking dry, soaking rolled, alkaline clean, water rinse, dry and oil the natural cellulose fiber to produce natural cellulose fiber of flame retarding capacity. Because of cross-linking reaction for the flame retardant of N-(hydroxymethyl)-3-(methoxy phosphorus acyl) with natural cellulose fiber, the flame-retarding capability thereof meet requirements of testing standards in American ASTM D6413-1999 and ASTM D2863-1995. Moreover, the wastes thereof meet the requirements of environment protections without harm.

10 Claims, 3 Drawing Sheets

(56) References Cited

U.S. PATENT DOCUMENTS

| | | | |
|---|---|---|---|
| 6,045,587 A * | 4/2000 | Cheng et al. | 8/116.1 |
| 7,858,005 B2 | 12/2010 | Thole et al. | |
| 7,938,993 B2 * | 5/2011 | Bhushan et al. | 264/37.24 |
| 2002/0060382 A1 * | 5/2002 | Luo et al. | 264/187 X |
| 2009/0186189 A1 * | 7/2009 | White et al. | 264/103 X |

* cited by examiner

FABRICATION OF NATURAL CELLULOSE FIBER WITH FLAME-RETARDING CAPABILITY

FIELD OF THE PRESENT INVENTION

The present invention relates to a fabrication of natural cellulose fiber with flame-retarding capability, which belongs to technical field of eco-friendly fiber fabrication. The process of the present invention comprises: blend wood pulp and solvent of N-methylmorpholine N-oxide (NMMO) to form into slurry; secondly, evaporate slurry to form a spinning dope; spin and extrude dope out of spinnerets to form spinning filaments; water-rinse and dry the spinning filaments to form natural cellulose fiber; orderly soaking roll, heating dry, bake, neutralize, soaping clean, water rinse, baking dry and successively alkaline clean, water rinse, dry and oil the natural cellulose fiber to produce natural cellulose fiber of long-acting flame retarding capacity.

BACKGROUND OF THE INVENTION

Currently, most fiber fabricating raw materials used in the fireproof or flame retarding fabrics are mixtures of polyacrylonitrile fiber family and Polyacrylonitrile fiber family evenly blended by mechanical means such as that shown in the Taiwan Patent Certificated No. I24848, or multi-bundled Polyacrylonitrile fiber via directly rolling traction in rolling stage by thermal means such as that shown in the Taiwan Patent Certificated No. 182661, or Polyolefin added with flame retardant by chemically copolymerization such as that shown in the Taiwan Patent Certificated No. 191223. Besides, there are some inferior fireproof or flame retarding fabrics, which are sparingly processed by only directly coating flame retarding agent on the surface of those raw materials mentioned above for scanting manufacturing cost.

However, all the fireproof or flame retarding fibers mentioned above belong to non-biodegradable fiber, whose wastes are harmful to natural environment due to unable to be naturally degraded. Accordingly, most countries stipulate relevant technical regulations about flammability for textile products in succession so that importing and marketing of such textile products against these technical regulations is prohibited Nevertheless, demand of the fireproof or flame retarding textile products is constantly increasing with result in substantial increasing of non-biodegradable fiber wastes, which lead to significantly unfavorable burden for natural environment. Moreover, for those textile products employed frugal process by adding or only directly coating flame retarding agent on those raw materials mentioned above, they may be reducing related manufacturing cost but at the sacrifice of flame retarding effect, which contrarily incurs invisible worry for household safety and human security.

In view of these foregoing facts, how to produce expected natural cellulose fibers, namely solvent-spun fiber, with long-acting flame retarding capability via special cross-linking reaction under preset process conditions becomes a critical and urgent demand.

SUMMARY OF THE INVENTION

The primary object of the present invention is to provide a fabrication of natural cellulose fiber with flame-retarding capability comprising processing steps as below: blend wood pulp and solvent of N-methylmorpholine N-oxide (NMMO) to form into slurry; evaporate extra water content from the prepared slurry by a Thin Film Evaporator (TFE) to form a spinning dope; by Dry-Jet Wet Spinning method, spin and extrude dope out of spinnerets into a coagulation bath for coagulating and regenerating it into spinning filaments; water-rinse and dry the spinning filaments to form natural cellulose fiber; soaking roll the natural cellulose fiber by flame retardant of N-(hydroxymethyl)-3-(methoxy phosphorus acyl); orderly heating dry, twice bake, neutralize, soaping clean, water rinse and baking dry the soaking rolled natural cellulose fiber; and successively alkaline clean, water rinse, dry and oil the natural cellulose fiber to produce natural cellulose fiber of long-acting flame retarding capacity. Because the cross-linking reaction for the flame retardant of N-(hydroxymethyl)-3-(methoxy phosphorus acyl) with natural cellulose fiber during fabricating process, the flame-retarding capability for fabrics made from the natural cellulose fiber of the present invention, even after water-rinsing for 50 times, can meet not only strict requirement in the quality control but also the requirements of testing standards in American ASTM D6413-1999 and ASTM D2863-1995. Moreover, the wastes of the natural cellulose fiber itself or its fabric can be naturally degraded or decomposed to meet the requirements of environment protections.

The other object of the present invention is to provide a fabrication of natural cellulose fiber with flame-retarding capability with a solvent recycling process of N-methylmorpholine N-oxide (NMMO) comprising processing steps of bleaching, filtrating, condensing and refining by simple and effective processing facilities so that aquatic solution processed can be recycled into solvent of N-methylmorpholine N-oxide (NMMO) with quality almost being the same as that of fresh solvent, wherein the consumption rate is controlled down to less of 0.5% while total recycling rate reaches over 99.5%. Thereby, the present invention is not only unable to pollute the environment but also able to reduce the solvent recycling cost so that it has effects in eco-friendly production and resource recycling economy.

DETAILED DESCRIPTION OF THE PREFERRED EMBODIMENTS

For further manifesting fabricating procedures of the present invention, some exemplary preferred embodiments are described below with associated drawing figures.

Figure 1:
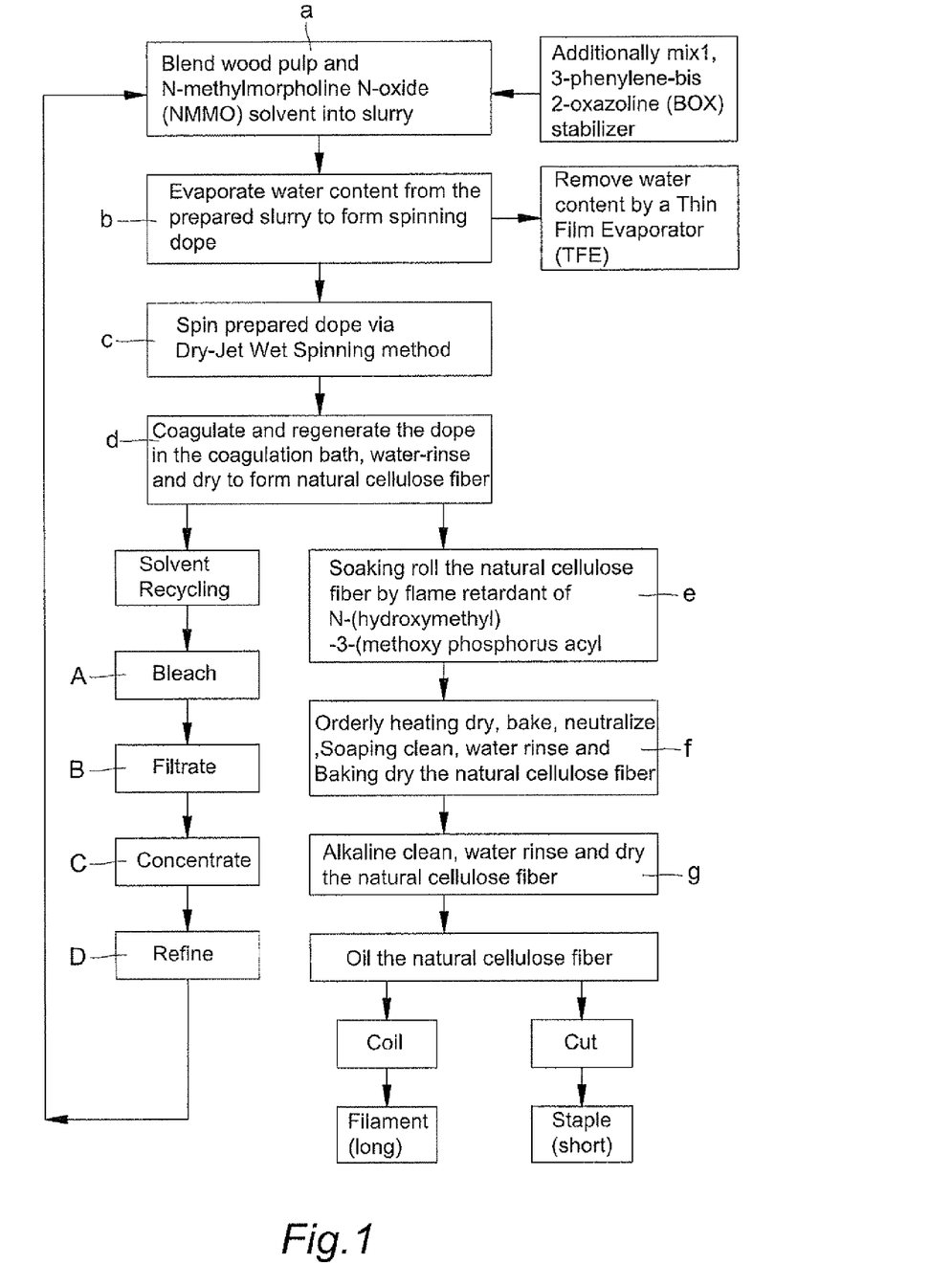
FIG. 1 is a flow chart of block diagram showing the fabricating process of the present invention.
Figure 2:
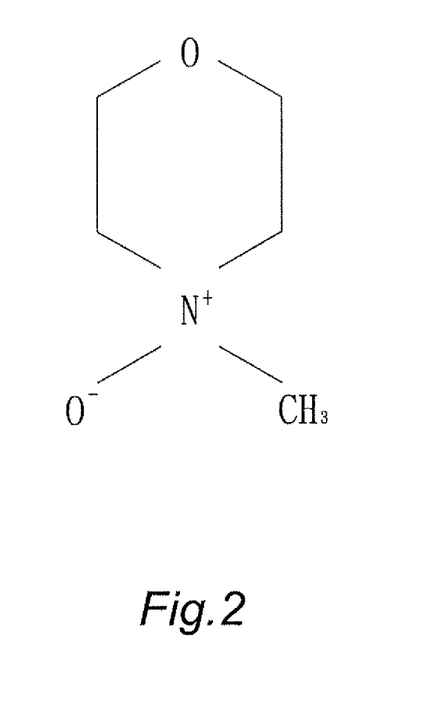
FIG. 2 is a chemical structure of the N-methylmorpholine N-oxide (called NMMO for short) used in the present invention.
Figure 3:
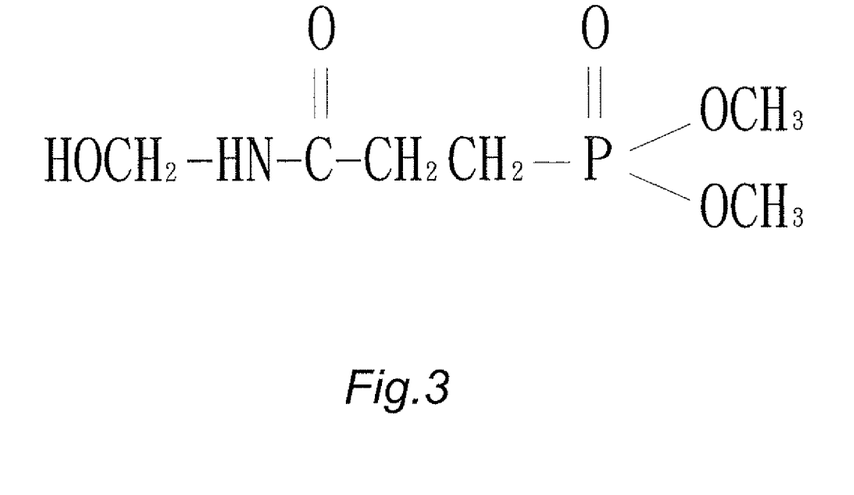
FIG. 3 is a chemical structure of the flame retardant of N-(hydroxymethyl)-3-(methoxy phosphorus acyl) used in the present invention.

Please refer to FIGS. 1 through 3. The fabrication of natural cellulose fiber with flame-retarding capability of the present invention comprises following processing steps:

(a). Blend raw material of wood pulp and solvent of N-methylmorpholine N-oxide (NMMO) to form into slurry, next additionally mix stabilizer of 1,3-phenylene-bis 2-oxazoline (BOX) into prepared slurry; Then, agitate and crush the slurry of wood pulp, N-methylmorpholine N-oxide (NMMO) and 1,3-phenylene-bis 2-oxazoline (BOX) in a horizontal slurry blending machine by under low temperature between 60 degree of Celsius and 80 degree of Celsius (60° C.-80° C.); Wherein, said wood pulp is preferably pulp cellulose of hard wood or soft wood with α-cellulose content being over 65% and degree of polymerization (DP) being between 500-1200, and the concentration of said N-methylmorpholine N-oxide (NMMO) is 50%-75% with chemical structure thereof as shown in FIG. 2;

(b). Evaporate extra water content from the prepared slurry by a Thin Film Evaporator (TFE) under temperature between 80 degree of Celsius and 120 degree of Celsius (80° C.-120° C.) heating for 5 minutes to remove extra water content so that a spinning dope is formed with water content of 5%-13%;

(c). By means of Dry-Jet Wet Spinning method, spin prepared spinning dope and extrude said spinning dope out of a plurality of spinnerets and into a coagulation bath, then coagulate said spinning dope in the coagulation bath and regenerate it into spinning filaments;

(d). Water-rinse and dry the spinning filaments under temperature between 100 degree of Celsius and 130 degree of Celsius (100° C.-130° C.) heating for 3-5 minutes to form natural cellulose fiber;

(e). Soaking roll the natural cellulose fiber by flame retardant of N-(hydroxymethyl)-3-(methoxy phosphorus acyl) such that the proportion of rolling liquid is 65%-70% and the concentration of N-(hydroxymethyl)-3-(methoxy phosphorus acyl) is 250 g/L-500 g/L with chemical structure thereof as shown in FIG. 3;

(f). Orderly heating dry, twice bake, neutralize, soaping clean, water rinse and baking dry the soaking rolled natural cellulose fiber, wherein the heating dry is performed under temperature at 105 degree of Celsius (105° C.) heating for 10 seconds, first bake is performed under temperature between 130 degree of Celsius and 155 degree of Celsius (130° C.-155° C.) heating for 60-120 seconds while second bake is performed under temperature between 165 degree of Celsius and 180 degree of Celsius (165° C.-180° C.) heating for 60-120 seconds, the neutralize is performed in an alkaline solution with concentration of 50 g/L under temperature between 20 degree of Celsius and 30 degree of Celsius (20° C.-30° C.), and the soaping clean is performed in an alkaline solution with concentration of 2 g/L having soaping powder concentration of 3 g/L under temperature between 20 degree of Celsius and 30 degree of Celsius (20° C.-30° C.) for 10 seconds; and (g). Successively alkaline clean, water rinse, dry and oil the natural cellulose fiber to produce natural cellulose fiber of long-acting flame retarding capacity, then either obtain long filament via coiling means or short staple via cutting means in accordance with specific product demand, wherein the alkaline clean is performed in an alkaline solution of NaOH or $Na_2CO_3$, the coiling speed is 200-600 meters per minute, as well as the produced natural cellulose fiber has fiber strength of 3.0 g/d-5.0 g/d, fiber elongation of 4.0%4.0% and Young's modulus of 50 g/d-150 g/d.

For the foregoing step (a) about additionally mixing stabilizer of 1,3-phenylene-bis 2-oxazoline (BOX) into prepared slurry, the stabilizer is firstly formulated as 500-2500 PPM of 1,3-phenylene-bis 2-oxazoline (BOX), the stabilizer is secondly blended in the solvent of N-methylmorpholine N-oxide (NMMO), and the stabilizer is finally mixed with wood pulp to form into slurry. Two key physical properties for different of proportion of added stabilizer of 1,3-phenylene-bis 2-oxazoline (BOX) are tabulated as in following Table-A.

TABLE A

| PBOX (ppm) | IXT (470 nm) | RDDP (%) |
|---|---|---|
| 500 | 20.1 | 26.2 |
| 1000 | 15.2 | 20.5 |

TABLE A-continued

| PBOX (ppm) | IXT (470 nm) | RDDP (%) |
|---|---|---|
| 1500 | 13.8 | 14.7 |
| 2000 | 10.2 | 11.6 |
| 2500 | 9.8 | 11.3 |

Notation
BOX denotes 1,3-phenylene-bis 2-oxazoline (BOX) stabilizer.
PBOX denotes Proportion of added BOX.
DP denotes degree of polymerization.
IXT denotes index of light transmittance.
RDDP denotes rate of decline for degree of polymerization.

Comparing to conventional stabilizers of sodium hexametaphosphate (SHMP) and n-proply gallate (P.G), the stabilizer of 1,3-phenylene-bis 2-oxazoline (BOX) used in the present invention is less coloring affected with 10.2 for spectrophotometer index of light transmittance under 470 nm of coloring index as shown in following Table-B so that not only the refining process of solvent recycling can be simplified but also the unit price thereof is much cheaper than that of foregoing conventional stabilizer SHMP or P.G as shown in Table-C.

TABLE B

| Additive Kind | DP | CC | PAA (ppm) | IXT (470 nm) | RDDP (%) |
|---|---|---|---|---|---|
| AK-1 | 950 | 13.3% | 2000 | 46.8 | 26.1 |
| AK-2 | 950 | 13.3% | 2000 | 51.1 | 26.7 |
| AK-3 | 950 | 13.3% | 2000 | 10.2 | 11.6 |

Notation
AK-1 denotes sodium hexametaphosphate (SHMP) stabilizer.
AK-2 denotes n-proply gallate (P.G.) stabilizer.
AK-3 denotes 1,3-phenylene-bis 2-oxazoline (BOX) stabilizer.
DP denotes degree of polymerization for cellulose.
CC denotes concentration of cellulose.
PAA denotes proportion of added additive.
IXT denotes index of light transmittance.
RDDP denotes rate of decline for degree of polymerization.

TABLE C

| Additive Kind | UP | PAA (ppm) | Conventional | | Present Invention (Unit: NT$/Kg) | |
|---|---|---|---|---|---|---|
| | | | CSV | Total | CSV | Total |
| AK-1 | 1000.00 | 2000 | 270.00 | 270.27 | 195.00 | 195.27 |
| AK-2 | 28000.00 | 2000 | 270.00 | 277.50 | 195.00 | 202.50 |
| AK-3 | 960.00 | 2000 | — | — | 195.00 | 195.26 |

Notation
AK-1 denotes sodium hexametaphosphate (SHMP) stabilizer.
AK-2 denotes n-proply gallate (P.G.) stabilizer.
AK-3 denotes 1,3-phenylene-bis 2-oxazoline (BOX) stabilizer.
UP denotes unit price.
PAA denotes proportion of added additive.
CSV denotes cost of solvent.

Besides, the key solvent of N-methylmorpholine N-oxide (NMMO) used in the present invention will be released out during processes of the regenerating and water-rinsing of step (d) in great quantity, which should be collected for recycling so as to amply reused in recurring manner as the recovery rate will significantly affect the integral process cost. As shown in FIG. 1, the solvent recycling process of N-methylmorpholine N-oxide (NMMO) comprises following steps:

A. Bleaching:

The bleaching process of the present invention is performed by absorption of suspending active carbon with practical steps as below: put 0.05%-0.10% of active carbon powder with good absorptivity and suspension ability into the liquid of NMMO solvent to be de-colored, then alternate the air-blast mixing with absorption and the stationary suspending absorption treatments with treating time ratio between 1:3 to 1:6 for 8 hours to finish the bleaching procedure so that the advantages of the decolorizing process of the present invention are simplifying process facilities, saving energy and enhancing effect of absorbing decolorization.

B. Filtrating:

The filtrating process of the present invention is performed by bi-phase filtration of coarse filtering and fine filtering. First coarse filtering phase: for simplifying the processing facility, general cartridge filter is used with filter aid composing of diatomite and cellulose preferably made of diatomite to cellulose in ratio of 4:1. In order to avoid hindering filtrating speed incurred by active carbon from gradually accumulating on the surface of the filtering cartridge, a filter aid is put in the solution to be filtrated with 0.03%-0.05% content other than spread over the surface of the filtering cartridge. Besides, minor puffing agent is also added therein to enhance filtrating speed without degeneracy. After completion of the coarse filtering phase, the filtering dregs and the residual liquid are centrifugal and dehydrating treated for recycling use so that the residual auxiliary filtering agent dehydrated can be reused as auxiliary filtering effect being remained. Second fine filtering phase: Ultrafiltration (UF) filter is used so that the cleanness of the filtrated liquid is the same as that of the fresh solvent. The advantages of the bi-phase filtrating process of the present invention are low cost of process facilities, low ratio of consumption rate, high throughput and high cleanness.

C. Concentrating:

To recover the water rinsing liquid in the present invention, the condensing load in dehydration is very large in manner of approximately 90 tons per ton of fiber as solvent concentration must be condensed from 6.5%-8.0% to 50%-55%. For low yield quantity of fiber, the tri-effect condensing method is adopted to dehydrate per ton of rinsing liquid in using 0.5 ton of steam (high steam consumption but low electric power consumption) while for high yield quantity of fiber, the Mechanical Vapor Recompression (MVR) condensing method is adopted to dehydrate per ton of rinsing liquid in using 0.003-0.03 ton of steam (low steam consumption but high electric power consumption). The yield condensed solvent and water in both foregoing condensing methods can also be completely recovered for reusing though each condensing method is only suitable for different specific yield quantity of fiber. Wherein, the yield condensed solvent can be recycled for reusing as processing solvent and yield condensed water can be recycled for reusing to rinse fiber.

D. Refining:

Adopting temperature at 80 degree of Celsius (80° C.) low temperature oxidation and neutralizing reduction. Using 35% $H_2O_2$ as oxidant and 85% $N_2H_4 \cdot H_2O$ as neutralizing reductant, the result is measured by electric potential titrating method. The NMMO content can be decreased down below 10 ppm so that not only the purity of NMMO can be promoted but also the NMMO consumption can be decreased.

For expedite you to further understand the efficacy of the present invention, the experimental embodiments with different compositions, conditions and parameters in accordance with process thereof are described in detail as below.

Embodiment 1

Specimens in Number D1-D12 and F1-F12

Blend cellulose of wood pulp in degree of polymerization (DP) being 650 and solvent of N-methylmorpholine N-oxide (NMMO) to form into slurry, next additionally mix stabilizer of 1,3-phenylene-bis 2-oxazoline (BOX) in different added proportion into prepared slurry. Then, evaporate extra water content from the prepared slurry by a Thin Film Evaporator (TFT) under temperature between 80 degree of Celsius and 120 degree of Celsius (80° C.-120° C.) heating for 5 minutes to remove extra water content so that a spinning dope is formed with water content of 5%-13%. The composition table of dope for different specimens indicated D1-D12 is shown in Table-1. By means of Dry-Jet Wet Spinning method, force the dope to spinning machine by metering pump for extruding the dope out of a plurality of spinnerets and into a coagulation bath. Then, coagulate said spinning dope in the coagulation bath and regenerate it into spinning filaments for water-rinsing and drying to form natural cellulose fiber. Soaking roll the natural cellulose fiber by flame retardant of N-(hydroxymethyl)-3-(methoxy phosphorus acyl) such that the proportion of rolling liquid is 65%-70% and the concentration of N-(hydroxymethyl)-3-(methoxy phosphorus acyl) is 0 g/L-450 g/L. Orderly neutralize, soaping clean, water rinse and baking dry the soaking rolled natural cellulose fiber, wherein the bake is performed at temperature 180 degree of Celsius (180° C.) for 240 seconds, and successively alkaline clean, water rinse, dry and oil the natural cellulose fiber to produce natural cellulose filament of long-acting flame retarding capacity. For physical properties in specimens of foregoing natural cellulose fibers produced are indicated by specimen number F1-F12 shown in Table-2.

Embodiment 2

Specimens in Number D13-D24 and F13-F24

Blend cellulose of wood pulp in degree of polymerization (DP) being 1050 and solvent of N-methylmorpholine N-oxide (NMMO) to form into slurry, next additionally mix stabilizer of 1,3-phenylene-bis 2-oxazoline (BOX) in different added proportion into prepared slurry. Then, evaporate extra water content from the prepared slurry by a Thin Film Evaporator (TFE) under temperature between 80 degree of Celsius and 120 degree of Celsius (80° C.-120° C.) heating for 5 minutes to remove extra water content so that a spinning dope is formed with water content of 5%-13%. The composition table of dope for different specimens indicated D13-D24 is shown in Table-1. By means of Dry-Jet Wet Spinning method, force the dope to spinning machine by metering pump for extruding the dope out of a plurality of spinnerets and into a coagulation bath. Then, coagulate said spinning dope in the coagulation bath and regenerate it into spinning filaments for water-rinsing and drying to form natural cellulose fiber. Soaking roll the natural cellulose fiber by flame retardant of N-(hydroxymethyl)-3-(methoxy phosphorus acyl) such that the proportion of rolling liquid is 65%-70% and the concentration of N-(hydroxymethyl)-3-(methoxy phosphorus acyl) is 0 g/L-450 g/L. Orderly neutralize, soaping clean, water rinse and baking dry the soaking rolled natural cellulose fiber, wherein the bake is performed at temperature 180 degree of Celsius (180° C.) for 240 seconds, and successively alkaline clean, water rinse, dry and oil the natural cellulose fiber to produce natural cellulose filament of long-acting flame retarding capacity. For physical properties in specimens of foregoing natural cellulose fibers produced are indicated by specimen number F13-F24 shown in Table-2.

TABLE 1

Composition of dope for different specimens

| Specimen | DP | PAS (ppm) | CC (%) | SC (%) | WC (%) | RDDP (%) |
|---|---|---|---|---|---|---|
| (Embodiment 1: Number of fiber specimen D1-D12) | | | | | | |
| D1  | 650 | 0     | 12.2 | 77.3 | 10.5 | 25.5 |
| D2  | 650 | 500   | 12.1 | 77.9 | 10.0 | 23.6 |
| D3  | 650 | 1000  | 12.7 | 77.2 | 9.9  | 21.2 |
| D4  | 650 | 2000  | 12.1 | 78.0 | 9.9  | 18.1 |
| D5  | 650 | 3000  | 11.8 | 77.8 | 10.4 | 17.8 |
| D6  | 650 | 4000  | 12.5 | 77.9 | 9.6  | 16.5 |
| D7  | 650 | 5000  | 12.1 | 77.6 | 10.3 | 16.0 |
| D8  | 650 | 6000  | 12.7 | 77.8 | 9.5  | 15.7 |
| D9  | 650 | 7000  | 12.1 | 77.7 | 10.1 | 15.0 |
| D10 | 650 | 8000  | 11.8 | 78.3 | 9.9  | 13.5 |
| D11 | 650 | 9000  | 12.4 | 78.0 | 9.6  | 11.3 |
| D12 | 650 | 10000 | 12.7 | 77.8 | 9.5  | 11.1 |
| (Embodiment 2: Number of fiber specimen D13-D24) | | | | | | |
| D13 | 1050 | 0     | 12.1 | 77.8 | 10.1 | 26.3 |
| D14 | 1050 | 500   | 12.1 | 77.1 | 11.1 | 24.9 |
| D15 | 1050 | 1000  | 11.7 | 78.1 | 10.8 | 21.8 |
| D16 | 1050 | 2000  | 11.8 | 78.0 | 10.2 | 19.1 |
| D17 | 1050 | 3000  | 11.7 | 78.0 | 10.3 | 18.4 |
| D18 | 1050 | 4000  | 11.5 | 78.2 | 10.3 | 17.5 |
| D19 | 1050 | 5000  | 11.8 | 77.2 | 11.0 | 16.6 |
| D20 | 1050 | 6000  | 12.0 | 77.5 | 10.5 | 16.0 |
| D21 | 1050 | 7000  | 11.7 | 78.1 | 10.2 | 15.7 |
| D22 | 1050 | 8000  | 12.3 | 77.2 | 10.5 | 14.9 |
| D23 | 1050 | 9000  | 12.1 | 78.0 | 9.9  | 12.5 |
| D24 | 1050 | 10000 | 12.2 | 78.1 | 9.7  | 11.7 |

Notation
DP denotes degree of polymerization for cellulose.
PAS denotes proportion of added stabilizer.
CC denotes content of cellulose.
SC denotes content of cellulose.
WC denotes content of water.
IXT denotes index of light transmittance.
RDDP denotes rate of decline for degree of polymerization.

TABLE 2

Physical properties of natural cellulose fiber treated by flame retardants of different concentration

| specimen | DP | CFR (g/L) | FS (g/d) | FE (%) | IXFYM (g/d) |
|---|---|---|---|---|---|
| (Embodiment 1: Number of fiber specimen F1-F12) | | | | | |
| F1  | 650 | 0   | 4.4 | 6.6 | 135 |
| F2  | 650 | 20  | 4.4 | 6.5 | 132 |
| F3  | 650 | 50  | 4.3 | 6.3 | 128 |
| F4  | 650 | 80  | 4.3 | 6.3 | 122 |
| F5  | 650 | 100 | 4.2 | 6.0 | 118 |
| F6  | 650 | 150 | 4.2 | 5.5 | 106 |
| F7  | 650 | 200 | 4.2 | 5.2 | 98  |
| F8  | 650 | 250 | 4.1 | 4.9 | 94  |
| F9  | 650 | 300 | 4.1 | 4.8 | 90  |
| F10 | 650 | 350 | 4.0 | 4.8 | 85  |
| F11 | 650 | 400 | 4.0 | 4.5 | 83  |
| F12 | 650 | 450 | 4.0 | 4.3 | 82  |
| (Embodiment 2: Number of fiber specimen F13-F24) | | | | | |
| F13 | 1050 | 0   | 4.7 | 6.7 | 145 |
| F14 | 1050 | 20  | 4.7 | 6.7 | 138 |
| F15 | 1050 | 50  | 4.6 | 6.5 | 135 |
| F16 | 1050 | 80  | 4.6 | 6.5 | 133 |
| F17 | 1050 | 100 | 4.5 | 6.2 | 125 |
| F18 | 1050 | 150 | 4.5 | 5.7 | 114 |
| F19 | 1050 | 200 | 4.4 | 5.4 | 106 |
| F20 | 1050 | 250 | 4.3 | 5.2 | 100 |
| F21 | 1050 | 300 | 4.3 | 5.0 | 97  |
| F22 | 1050 | 350 | 4.3 | 5.0 | 96  |
| F23 | 1050 | 400 | 4.2 | 4.7 | 92  |
| F24 | 1050 | 450 | 4.2 | 4.4 | 89  |

Notation
DP denotes degree of polymerization for cellulose.
CFR denotes concentration of flame retardant.
FS denotes index of fiber strength.
FE denotes index of fiber elongation.
IXFYM denotes index of Young's modulus for fiber.

Embodiment 3

Test for Flame Retarding Capability

Blend cellulose of wood pulp in degree of polymerization (DP) being 650 and 1050 with solvent of N-methylmorpholine N-oxide (NMMO) to form into slurry, next additionally mix stabilizer of 1,3-phenylene-bis 2-oxazoline (BOX) into prepared slurry. Then, evaporate extra water content from the prepared slurry by a Thin Film Evaporator (TFE) under temperature between 80 degree of Celsius and 120 degree of Celsius (80° C.-120° C.) heating for 5 minutes to remove extra water content so that a spinning dope is formed with water content of 5%-13%. By means of Dry-Jet Wet Spinning method, force the dope to spinning machine by metering pump for extruding the dope out of a plurality of spinnerets and into a coagulation bath. Then, coagulate said spinning dope in the coagulation bath and regenerate it into spinning filaments for water-rinsing and drying to form natural cellulose fiber. Soaking roll the natural cellulose fiber by flame retardant of N-(hydroxymethyl)-3-(methoxy phosphorus acyl) such that the proportion of rolling liquid is 65%-70% and the concentration of N-(hydroxymethyl)-3-(methoxy phosphorus acyl) is 0 g/L-450 g/L. Orderly neutralize, soaping clean, water rinse and baking dry the soaking rolled natural cellulose fiber, wherein the bake is performed between temperature range in 130-180 degree of Celsius (130° C.-180° C.) for 120-240 seconds, and successively alkaline clean, water rinse, dry and oil the natural cellulose fiber to produce natural cellulose filament of long-acting flame retarding capacity for the present invention. All related items of flame retarding capability for specimens of foregoing natural cellulose fibers produced are tested in accordance with American ASTM D6413-1999 testing standards.

A vertical burning method, which is adopted for the test of flame retarding capability, comprises following steps. Firstly, respectively weave each specimen of all F1-F24 fiber specimens into three pieces of sample such that each piece of sample is dimensioned in 1.5 cm×24.5 cm, secondly, fix each piece of sample on a fireproof test apparatus such that the distance between the lower end of each piece of sample and burner mouth of the fireproof test apparatus is 19 mm, thirdly, adjust burner flame of the fireproof test apparatus at height of 38 mm to perform test of flame retarding capability for 12 seconds, fourthly, remove away the burner flame of the fireproof test apparatus and meanwhile press the start button of a stopwatch for starting time count, fifthly, upon all remaining ash (ember) on the testing sample is completely extinguished, press the stop button of the stopwatch for stopping time count, and finally, record each continual time of remaining flame and each time of remaining ash (ember).

The measurement in distance of carbonization comprises following steps. Remove away each piece of sample from the fireproof test apparatus after having finished foregoing test of flame retarding capability, next fold each piece of sample and press down at one lower side of the folded sample a hammer-like weight with area thereof corresponding to that of the folded sample, then hold the other lower side of the folded sample and turn it upside down, and test disconnecting distance for each piece of sample.

All testing results obtained in foregoing various tests for specimens are shown in Table-3 with specimen number of F1-F24 indicated and Table-4 with specimen number of T1-T24 indicated.

TABLE 3

Flame retarding test of natural cellulose fiber treated by different concentration of flame retardants but under same baking temperature at 180 degree of Celsius (180° C.) and same baking time of 240 seconds

| Specimen | DP | CFR (g/L) | TRF (second) | TRA (second) | DC (mm) | TE (Yes/No) |
|---|---|---|---|---|---|---|
| F1 | 650 | 0 | >30 | >30 | >200 | No |
| F2 | 650 | 20 | >10 | >20 | >200 | No |
| F3 | 650 | 50 | >5 | >10 | >150 | No |
| F4 | 650 | 80 | >3 | >5 | >100 | No |
| F5 | 650 | 100 | >1 | >2 | >100 | No |
| F6 | 650 | 150 | 0 | 0.5 | 60 | slight |
| F7 | 650 | 200 | 0 | 0.3 | 52 | slight |
| F8 | 650 | 250 | 0 | 0.2 | 50 | Yes |
| F9 | 650 | 300 | 0 | 0.1 | 49 | Yes |
| F10 | 650 | 350 | 0 | 0 | 49 | Yes |
| F11 | 650 | 400 | 0 | 0 | 47 | Yes |
| F12 | 650 | 450 | 0 | 0 | 45 | Yes |
| F13 | 1050 | 0 | >30 | >30 | >200 | No |
| F14 | 1050 | 20 | >10 | >20 | >200 | No |
| F15 | 1050 | 50 | >5 | >10 | >150 | No |
| F16 | 1050 | 80 | >3 | >5 | >100 | No |
| F17 | 1050 | 100 | >1 | >2 | >100 | No |
| F18 | 1050 | 150 | 0 | 0.5 | 60 | slight |
| F19 | 1050 | 200 | 0 | 0.3 | 54 | slight |
| F20 | 1050 | 250 | 0 | 0.2 | 50 | Yes |
| F21 | 1050 | 300 | 0 | 0.1 | 49 | Yes |
| F22 | 1050 | 350 | 0 | 0 | 48 | Yes |
| F23 | 1050 | 400 | 0 | 0 | 47 | Yes |
| F24 | 1050 | 450 | 0 | 0 | 45 | Yes |

Notation
DP denotes degree of polymerization for cellulose.
CFR denotes concentration of flame retardant.
TRF denotes time of remaining flame.
TRA denotes time of remaining ash (ember).
DC denotes distance of carbonization for fiber.
TE denotes effect of test.

TABLE 4

Flame retarding test of natural cellulose fiber treated by same concentration in 450 g/L of flame retardants but under different baking temperature and different baking time

| specimen | DP | BTE (° C.) | BTM (sec.) | TRF (sec.) | TRA (sec.) | DC (mm) | TE (Yes/No) |
|---|---|---|---|---|---|---|---|
| T1 | 650 | 130 | 240 | >3 | >5 | >100 | No |
| T2 | 650 | 140 | 240 | >1 | >2 | >100 | No |
| T3 | 650 | 150 | 240 | >1 | >2 | >90 | No |
| T4 | 650 | 160 | 240 | 0 | >1 | >75 | slight |
| T5 | 650 | 170 | 240 | 0 | 1 | >65 | slight |
| T6 | 650 | 180 | 120 | 0 | 0.5 | 60 | Yes |
| T7 | 650 | 180 | 140 | 0 | 0.3 | 52 | Yes |
| T8 | 650 | 180 | 160 | 0 | 0.2 | 50 | Yes |
| T9 | 650 | 180 | 180 | 0 | 0.1 | 49 | Yes |
| T10 | 650 | 180 | 200 | 0 | 0 | 49 | Yes |
| T11 | 650 | 180 | 220 | 0 | 0 | 47 | Yes |
| T12 | 650 | 180 | 240 | 0 | 0 | 45 | Yes |
| T13 | 1050 | 130 | 240 | >3 | >5 | >100 | No |
| T14 | 1050 | 140 | 240 | >1 | >2 | >100 | No |
| T15 | 1050 | 150 | 240 | >1 | >2 | >90 | No |
| T16 | 1050 | 160 | 240 | 0 | >1 | >75 | slight |
| T17 | 1050 | 170 | 240 | 0 | 1 | >65 | slight |
| T18 | 1050 | 180 | 120 | 0 | 0.5 | 60 | Yes |
| T19 | 1050 | 180 | 140 | 0 | 0.3 | 54 | Yes |
| T20 | 1050 | 180 | 160 | 0 | 0.2 | 50 | Yes |
| T21 | 1050 | 180 | 180 | 0 | 0.1 | 49 | Yes |
| T22 | 1050 | 180 | 200 | 0 | 0 | 48 | Yes |
| T23 | 1050 | 180 | 220 | 0 | 0 | 47 | Yes |
| T24 | 1050 | 180 | 240 | 0 | 0 | 45 | Yes |

Notation
DP denotes degree of polymerization for cellulose.
BTE denotes baking temperature.
BTM denotes baking time.
TRF denotes time of remaining flame.
TRA denotes time of remaining ash (ember).
DC denotes distance of carbonization for fiber.
TE denotes effect of test.

Embodiment 4

Test for Flame Retarding Capability at Limit of Oxygen Index (L.O.I)

Blend cellulose of wood pulp in degree of polymerization (DP) being 650 and 1050 with solvent of N-methylmorpholine N-oxide (NMMO) to form into slurry, next additionally mix stabilizer of 1,3-phenylene-bis 2-oxazoline (BOX) into prepared slurry. Then, evaporate extra water content from the prepared slurry by a Thin Film Evaporator (TFE) under temperature between 80 degree of Celsius and 120 degree of Celsius (80° C.-120° C.) heating for 5 minutes to remove extra water content so that a spinning dope is formed with water content of 5%-13%. By means of Dry-Jet Wet Spinning method, force the dope to spinning machine by metering pump for extruding the dope out of a plurality of spinnerets and into a coagulation bath. Then, coagulate said spinning dope in the coagulation bath and regenerate it into spinning filaments for water-rinsing and drying to form natural cellulose fiber. Soaking roll the natural cellulose fiber by flame retardant of N-(hydroxymethyl)-3-(methoxy phosphorus acyl) such that the proportion of rolling liquid is 65%-70% and the concentration of N-(hydroxymethyl)-3-(methoxy phosphorus acyl) is 0 g/L-450 g/L. Orderly neutralize, soaping clean, water rinse and baking dry the soaking rolled natural cellulose fiber, wherein the bake is performed between temperature range in 130-180 degree of Celsius (130° C.-180° C.) for 120-240 seconds, and successively alkaline clean, water rinse, dry and oil the natural cellulose fiber to produce natural cellulose filament of long-acting flame retarding capacity for the present invention.

All related items of flame retarding capability at Limit of Oxygen Index (L.O.I) for specimens of foregoing natural cellulose fibers produced are tested in accordance with American ASTM D2863-1995 testing standards. The value of the Limit of Oxygen Index (L.O.I) is defined as minimal oxygen concentration required for keeping testing specimen of fiber or fabric in sustainable burning in a burning cylinder. The calculating formula thereof is expressed as below.

$$LOI = \frac{O_2}{O_2 + N_2} \times 100\%$$

The higher value of the Limit of Oxygen Index (L.O.I) means higher oxygen concentration is required for keeping testing specimen of fiber or fabric in sustainable burning in a burning cylinder. In other wards, the testing specimen is more difficult to burn.

All testing results obtained in foregoing various tests for specimens are shown in Table-5 with specimen number of F1-F24 indicated and Table-6 with specimen number of T1-T24 indicated.

TABLE 5

Flame retarding test of natural cellulose fiber treated by different concentration of flame retardants and different Limit of Oxygen Index (L.O.I) but under same baking temperature at 180 degree of Celsius (180° C.) and same baking time of 240 seconds

| Specimen | DP | CFR (g/L) | L.O.I | TE (Yes/No) |
|---|---|---|---|---|
| F1 | 650 | 0 | 17 | No |
| F2 | 650 | 20 | 18 | No |
| F3 | 650 | 50 | 19 | No |
| F4 | 650 | 80 | 19 | No |
| F5 | 650 | 100 | 22 | No |
| F6 | 650 | 150 | 25 | slight |
| F7 | 650 | 200 | 26 | slight |
| F8 | 650 | 250 | 28 | Yes |
| F9 | 650 | 300 | 32 | Yes |
| F10 | 650 | 350 | 32 | Yes |
| F11 | 650 | 400 | 34 | Yes |
| F12 | 650 | 450 | 38 | Yes |
| F13 | 1050 | 0 | 17 | No |
| F14 | 1050 | 20 | 18 | No |
| F15 | 1050 | 50 | 19 | No |
| F16 | 1050 | 80 | 19 | No |
| F17 | 1050 | 100 | 22 | No |
| F18 | 1050 | 150 | 25 | slight |
| F19 | 1050 | 200 | 26 | slight |
| F20 | 1050 | 250 | 30 | Yes |
| F21 | 1050 | 300 | 32 | Yes |
| F22 | 1050 | 350 | 33 | Yes |
| F23 | 1050 | 400 | 35 | Yes |
| F24 | 1050 | 450 | 38 | Yes |

Notation
DP denotes degree of polymerization for cellulose.
CFR denotes concentration of flame retardant.
L.O.I denotes limit of oxygen index (L.O.I).
TE denotes effect of test.

TABLE 6

Flame retarding test of natural cellulose fiber treated by same concentration in 450 g/L of flame retardants but different Limit of Oxygen Index (L.O.I) and under different baking temperature and different baking time

| Specimen | DP | BTE (° C.) | BTM (second) | L.O.I | TE (Yes/No) |
|---|---|---|---|---|---|
| T1 | 650 | 130 | 240 | 21 | No |
| T2 | 650 | 140 | 240 | 21 | No |
| T3 | 650 | 150 | 240 | 21 | No |
| T4 | 650 | 160 | 240 | 22 | slight |
| T5 | 650 | 170 | 240 | 22 | slight |
| T6 | 650 | 180 | 120 | 25 | slight |
| T7 | 650 | 180 | 140 | 26 | slight |
| T8 | 650 | 180 | 160 | 28 | Yes |
| T9 | 650 | 180 | 180 | 30 | Yes |
| T10 | 650 | 180 | 200 | 32 | Yes |
| T11 | 650 | 180 | 220 | 33 | Yes |
| T12 | 650 | 180 | 240 | 36 | Yes |
| T13 | 1050 | 130 | 240 | 21 | No |
| T14 | 1050 | 140 | 240 | 21 | No |
| T15 | 1050 | 150 | 240 | 21 | No |
| T16 | 1050 | 160 | 240 | 22 | slight |
| T17 | 1050 | 170 | 240 | 22 | slight |
| T18 | 1050 | 180 | 120 | 25 | slight |
| T19 | 1050 | 180 | 140 | 26 | slight |
| T20 | 1050 | 180 | 160 | 28 | Yes |
| T21 | 1050 | 180 | 180 | 30 | Yes |
| T22 | 1050 | 180 | 200 | 32 | Yes |
| T23 | 1050 | 180 | 220 | 33 | Yes |
| T24 | 1050 | 180 | 240 | 36 | Yes |

Notation
DP denotes degree of polymerization for cellulose.
BTE denotes baking temperature.
BTM denotes baking time.
L.O.I denotes limit of oxygen index (L.O.I).
DC denotes distance of carbonization for fiber.
TE denotes effect of test.

Embodiment 5

Test for Flame Retarding Capability after Water Rinsing for 50 Times

Blend cellulose of wood pulp in degree of polymerization (DP) being 650 and 1050 with solvent of N-methylmorpholine N-oxide (NMMO) to form into slurry, next additionally mix stabilizer of 1,3-phenylene-bis 2-oxazoline (BOX) into prepared slurry. Then, evaporate extra water content from the prepared slurry by a Thin Film Evaporator (TFE) under temperature between 80 degree of Celsius and 120 degree of Celsius (80° C.-120° C.) heating for 5 minutes to remove extra water content so that a spinning dope is formed with water content of 5%-13%. By means of Dry-Jet Wet Spinning method, force the dope to spinning machine by metering pump for extruding the dope out of a plurality of spinnerets and into a coagulation bath. Then, coagulate said spinning dope in the coagulation bath and regenerate it into spinning filaments for water-rinsing and drying to form natural cellulose fiber. Soaking roll the natural cellulose fiber by flame retardant of N-(hydroxymethyl)-3-(methoxy phosphorus acyl) such that the proportion of rolling liquid is 65%-70% and the concentration of N-(hydroxymethyl)-3-(methoxy phosphorus acyl) is 0 g/L-450 g/L. Orderly neutralize, soaping clean, water rinse and baking dry the soaking rolled natural cellulose fiber, wherein the bake is performed between temperature range in 130-180 degree of Celsius (130° C.-180° C.) for 120-240 seconds, and successively alkaline clean, water rinse, dry and oil the natural cellulose fiber to produce natural cellulose filament of long-acting flame retarding capacity for the present invention.

For specimens of foregoing natural cellulose fibers produced, they have to be firstly water rinsed for 50 times in accordance with AATCC 135-2004 Option 1 (2)v1 A(i) 4 Lb Load water rinsing method, then all related items of flame retarding capability thereof are tested in accordance with American ASTM D6413-1999 testing standards. All testing results obtained in foregoing various tests for specimens are shown in Table-7 with specimen number of F1-F24 indicated and Table-8 with specimen number of T1-T24 indicated.

TABLE 7

Flame retarding test of natural cellulose fiber treated by different concentration of flame retardants but under same baking temperature at 180 degree of Celsius (180° C.) and same baking time of 240 seconds then water rinsed for 50 times

| Specimen | DP | CFR (g/L) | TRF (sec.) | TRA (sec.) | DC (mm) | TE (Yes/No) |
|---|---|---|---|---|---|---|
| F1 | 650 | 0 | >30 | >30 | >200 | No |
| F2 | 650 | 20 | >10 | >20 | >200 | No |
| F3 | 650 | 50 | >5 | >10 | >150 | No |
| F4 | 650 | 80 | >3 | >5 | >100 | No |
| F5 | 650 | 100 | >1 | >2 | >100 | No |
| F6 | 650 | 150 | 0 | 0.5 | 65 | slight |
| F7 | 650 | 200 | 0 | 0.3 | 57 | slight |
| F8 | 650 | 250 | 0 | 0.2 | 52 | Yes |
| F9 | 650 | 300 | 0 | 0.1 | 50 | Yes |
| F10 | 650 | 350 | 0 | 0 | 50 | Yes |
| F11 | 650 | 400 | 0 | 0 | 49 | Yes |
| F12 | 650 | 450 | 0 | 0 | 48 | Yes |
| F13 | 1050 | 0 | >30 | >30 | >200 | No |
| F14 | 1050 | 20 | >10 | >20 | >200 | No |
| F15 | 1050 | 50 | >5 | >10 | >150 | No |
| F16 | 1050 | 80 | >3 | >5 | >100 | No |
| F17 | 1050 | 100 | >1 | >2 | >100 | No |
| F18 | 1050 | 150 | 0 | 0.5 | 62 | slight |
| F19 | 1050 | 200 | 0 | 0.3 | 55 | slight |
| F20 | 1050 | 250 | 0 | 0.2 | 52 | Yes |
| F21 | 1050 | 300 | 0 | 0.1 | 51 | Yes |
| F22 | 1050 | 350 | 0 | 0 | 50 | Yes |
| F23 | 1050 | 400 | 0 | 0 | 49 | Yes |
| F24 | 1050 | 450 | 0 | 0 | 46 | Yes |

Notation
DP denotes degree of polymerization for cellulose.
CFR denotes concentration of flame retardant.
TRF denotes time of remaining flame.
TRA denotes time of remaining ash (ember).
DC denotes distance of carbonization for fiber.
TE denotes effect of test.

TABLE 8

Flame retarding test of natural cellulose fiber treated by same concentration in 450 g/L of flame retardants but under different baking temperature and different baking time then water rinsed for 50 times

| Specimen | DP | BTE (° C.) | BTE (sec) | TRF (sec) | TRA (sec) | DC (mm) | TE (Yes/No) |
|---|---|---|---|---|---|---|---|
| T1 | 650 | 130 | 240 | >10 | >20 | >200 | No |
| T2 | 650 | 140 | 240 | >5 | >10 | >150 | No |
| T3 | 650 | 150 | 240 | >3 | >5 | >100 | No |
| T4 | 650 | 160 | 240 | >1 | >2 | >100 | No |
| T5 | 650 | 170 | 240 | 0 | 1 | >65 | slight |
| T6 | 650 | 180 | 120 | 0 | 0.5 | 65 | slight |
| T7 | 650 | 180 | 140 | 0 | 0.3 | 57 | slight |
| T8 | 650 | 180 | 160 | 0 | 0.2 | 52 | Yes |
| T9 | 650 | 180 | 180 | 0 | 0.1 | 50 | Yes |
| T10 | 650 | 180 | 200 | 0 | 0 | 50 | Yes |
| T11 | 650 | 180 | 220 | 0 | 0 | 49 | Yes |
| T12 | 650 | 180 | 240 | 0 | 0 | 48 | Yes |
| T13 | 1050 | 130 | 240 | >10 | >20 | >200 | No |
| T14 | 1050 | 140 | 240 | >5 | >10 | >150 | No |
| T15 | 1050 | 150 | 240 | >3 | >5 | >100 | No |
| T16 | 1050 | 160 | 240 | >1 | >2 | >100 | No |
| T17 | 1050 | 170 | 240 | 0 | 1 | >65 | slight |
| T18 | 1050 | 180 | 120 | 0 | 0.5 | 62 | slight |
| T19 | 1050 | 180 | 140 | 0 | 0.3 | 55 | slight |
| T20 | 1050 | 180 | 160 | 0 | 0.2 | 52 | Yes |
| T21 | 1050 | 180 | 180 | 0 | 0.1 | 51 | Yes |
| T22 | 1050 | 180 | 200 | 0 | 0 | 50 | Yes |
| T23 | 1050 | 180 | 220 | 0 | 0 | 49 | Yes |
| T24 | 1050 | 180 | 240 | 0 | 0 | 46 | Yes |

Notation
DP denotes degree of polymerization for cellulose.
BTE denotes baking temperature.
BTM denotes baking time.
TRF denotes time of remaining flame.
TRA denotes time of remaining ash (ember).
DC denotes distance of carbonization for fiber.
TE denotes effect of test.

Embodiment 6

Test for Flame Retarding Capability at Limit of Oxygen Index (L.O.I) after Water Rinsing for 50 Times Blend cellulose of wood pulp in degree of polymerization (DP) being 650 and 1050 with solvent of N-methylmorpholine N-oxide (NMMO) to form into slurry, next additionally mix stabilizer of 1,3-phenylene-bis 2-oxazoline (BOX) into prepared slurry. Then, evaporate extra water content from the prepared slurry by a Thin Film Evaporator (TFE) under temperature between 80 degree of Celsius and 120 degree of Celsius (80° C.-120° C.) heating for 5 minutes to remove extra water content so that a spinning dope is formed with water content of 5%-13%. By means of Dry-Jet Wet Spinning method, force the dope to spinning machine by metering pump for extruding the dope out of a plurality of spinnerets and into a coagulation bath. Then, coagulate said spinning dope in the coagulation bath and regenerate it into spinning filaments for water-rinsing and drying to form natural cellulose fiber. Soaking roll the natural cellulose fiber by flame retardant of N-(hydroxymethyl)-3-(methoxy phosphorus acyl) such that the proportion of rolling liquid is 65%-70% and the concentration of N-(hydroxymethyl)-3-(methoxy phosphorus acyl) is 0 g/L-450 g/L. Orderly neutralize, soaping clean, water rinse and baking dry the soaking rolled natural cellulose fiber, wherein the bake is performed between temperature range in 130-180 degree of Celsius (130° C.-180° C.) for 120-240 seconds, and successively alkaline clean, water rinse, dry and oil the natural cellulose fiber to produce natural cellulose filament of long-acting flame retarding capacity for the present invention.

For specimens of foregoing natural cellulose fibers produced, they have to be firstly water rinsed for 50 times in accordance with AATCC 135-2004 Option 1 (2)v1 A(i) 4 Lb Load water rinsing method, then all related items of flame retarding capability at Limit of Oxygen Index (L.O.I) thereof are tested in accordance with American ASTM D2863-1995 testing standards. All testing results obtained in foregoing various tests for specimens are shown in Table-9 with specimen number of F1-F24 indicated and Table-10 with specimen number of T1-T24 indicated.

TABLE 9

Flame retarding test of natural cellulose fiber treated by different concentration of flame retardants and different Limit of Oxygen Index (L.O.I) after 50 times of water rinsing but under same baking temperature at 180 degree of Celsius (180° C.) and same baking time of 240 seconds

| Specimen | DP | CFR (g/L) | WR-L.O.I | TE (Yes/No) |
|---|---|---|---|---|
| F1 | 650 | 0 | 15 | No |
| F2 | 650 | 20 | 15 | No |
| F3 | 650 | 50 | 16 | No |
| F4 | 650 | 80 | 18 | No |
| F5 | 650 | 100 | 21 | No |
| F6 | 650 | 150 | 21 | slight |
| F7 | 650 | 200 | 26 | slight |
| F8 | 650 | 250 | 27 | Yes |
| F9 | 650 | 300 | 31 | Yes |
| F10 | 650 | 350 | 32 | Yes |
| F11 | 650 | 400 | 35 | Yes |
| F12 | 650 | 450 | 36 | Yes |
| F13 | 1050 | 0 | 15 | No |
| F14 | 1050 | 20 | 15 | No |
| F15 | 1050 | 50 | 16 | No |
| F16 | 1050 | 80 | 18 | No |
| F17 | 1050 | 100 | 21 | No |
| F18 | 1050 | 150 | 24 | slight |
| F19 | 1050 | 200 | 26 | slight |
| F20 | 1050 | 250 | 27 | Yes |
| F21 | 1050 | 300 | 31 | Yes |
| F22 | 1050 | 350 | 32 | Yes |
| F23 | 1050 | 400 | 35 | Yes |
| F24 | 1050 | 450 | 36 | Yes |

Notation
DP denotes degree of polymerization for cellulose.
CFR denotes concentration of flame retardant.
WR-L.O.I denotes limit of oxygen index (L.O.I) after 50 times of water rinsing.
TE denotes effect of test.

TABLE 10

Flame retarding test of natural cellulose fiber treated by same concentration in 450 g/L of flame retardants but different Limit of Oxygen Index (L.O.I) after 50 times of water rinsing and under different baking temperature and different baking time

| Specimen | DP | BTE (° C.) | BTM (second) | WR-L.O.I | TE (Yes/No) |
|---|---|---|---|---|---|
| T1 | 650 | 130 | 240 | 21 | No |
| T2 | 650 | 140 | 240 | 21 | No |
| T3 | 650 | 150 | 240 | 21 | No |
| T4 | 650 | 160 | 240 | 22 | slight |
| T5 | 650 | 170 | 240 | 22 | slight |
| T6 | 650 | 180 | 120 | 25 | slight |
| T7 | 650 | 180 | 140 | 26 | slight |
| T8 | 650 | 180 | 160 | 28 | Yes |
| T9 | 650 | 180 | 180 | 30 | Yes |
| T10 | 650 | 180 | 200 | 32 | Yes |
| T11 | 650 | 180 | 220 | 33 | Yes |
| T12 | 650 | 180 | 240 | 36 | Yes |
| T13 | 1050 | 130 | 240 | 21 | No |
| T14 | 1050 | 140 | 240 | 21 | No |
| T15 | 1050 | 150 | 240 | 21 | No |
| T16 | 1050 | 160 | 240 | 22 | slight |
| T17 | 1050 | 170 | 240 | 22 | slight |
| T18 | 1050 | 180 | 120 | 25 | slight |
| T19 | 1050 | 180 | 140 | 26 | slight |
| T20 | 1050 | 180 | 160 | 28 | Yes |
| T21 | 1050 | 180 | 180 | 30 | Yes |
| T22 | 1050 | 180 | 200 | 32 | Yes |
| T23 | 1050 | 180 | 220 | 33 | Yes |
| T24 | 1050 | 180 | 240 | 36 | Yes |

Notation
DP denotes degree of polymerization for cellulose.
BTE denotes baking temperature.
BTM denotes baking time.
WR-L.O.I denotes limit of oxygen index (L.O.I) after 50 times of water rinsing.
TE denotes effect of test.

With all testing results obtained in foregoing flame retarding tests of natural cellulose fiber for all specimens shown in Tables 3 through 6, following facts can be realized for the natural cellulose fiber with flame-retarding capability of the present invention: When the content for flame retardant of N-(hydroxymethyl)-3-(methoxy phosphorus acyl) exceeds 200 g/L, the value of related limit of oxygen index (L.O.I) can reach over 25, when the content for flame retardant of N-(hydroxymethyl)-3-(methoxy phosphorus acyl) exceeds 350 g/L to meet the requirements of American ASTM D64134999 and ASTM D2863-1995, the value of related limit of oxygen index (L.O.I) can reach over 32, and when the content for flame retardant of N-(hydroxymethyl)-3-(methoxy phosphorus acyl) exceeds 450 g/L, though the value of related limit of oxygen index (L.O.I) can reach over 38, the physical properties of the testing fiber specimen are inclined to decrease as shown in Table-2. In order to look after both aspects of no decreasing in physical properties of the testing fiber specimen and keep adequately low cost of flame retardant, the content for flame retardant of N-(hydroxymethyl)-3-(methoxy phosphorus acyl) should not exceed 450 g/L. Therefore, the associated embodiments of Tables 3 through 6 reflect that the present invention can really achieve well flame retarding effect. Moreover, from all testing results obtained in foregoing flame retarding tests of natural cellulose fiber for all specimens after water rinsing for 50 times shown in Tables 7 through 10, the flame retarding capability for the fiber of the present invention not only can still maintain same original effect as that before water rinsing but also can meet the requirements of testing standards in American ASTM D6413-1999 and ASTM D2863-1995. Thus, it proves in self-explanatory manner that the flame-retarding capability for the long-acting natural cellulose fiber of the present invention substantially exceeds that of the conventional flame-retarding fibers in the general market, which is either coated flame retarding agent on the surface of fibers or added with conventional flame retarding agent.

In conclusion of the disclosure heretofore, because the cross-linking reaction for the flame retardant of N-(hydroxymethyl)-3-(methoxy phosphorus acyl) with natural cellulose fiber during fabricating process, the flame-retarding capability for fabrics made from the natural cellulose fiber of the present invention, even after water-rinsing for 50 times, can meet not only strict requirement in the quality control but also the requirements of testing standards in American ASTM D6413-1999 and ASTM D2863-1995. Besides, the present invention can produce natural cellulose fiber with flame retarding capability in various demanded specifications in accordance with different added proportion in the flame retardant of N-(hydroxymethyl)-3-(methoxy phosphorus acyl) so that the decreasing rate of fiber strength is less than 10%. Moreover, the wastes of the natural cellulose fiber itself or its fabric can be naturally degraded or decomposed to meet the requirements of environment protection so that it really has feature of industrial application, which meets basic criterion of the patentability. Accordingly, we submit the patent application in accordance with related patent laws.

What is claimed is:

1. A fabrication process for producing natural cellulose fibers with flame-retarding properties which comprises the following steps:
    (a) blending a raw material of wood pulp with a solvent of N-methylmorpholine N-oxide (NMMO) to form a slurry;
        next additionally adding a mix stabilizer comprising 1,3-phenylene-bis 2-oxazoline into the slurry;
        then agitate and crush the slurry of wood pulp, N-methylmorpholine N-oxide (NMMO) and 1,3-phenylene-bis 2-oxazoline (BOX) in a horizontal slurry blending machine under low temperature between 60 and 80 degrees Celsius;
    wherein, said wood pulp is a hard wood or soft wood cellulose pulp with an α-cellulose content being over 65% and a degree of polymerization (DP) being between 500-1200;
    (b) evaporate extra water content from the slurry by a Thin Film Evaporator (TFE) under a temperature between 80 and 120 degrees Celsius and heating for 5 minutes to remove extra water content so that a spinning dope is formed with a water content of 5%-13%;
    (c) by means of Dry-Jet Wet Spinning method, spin the prepared spinning dope and extrude said spinning dope out of a plurality of spinnerets and into a coagulation bath, then coagulate said spinning dope in the coagulation bath and regenerate it into spinning filaments;
    (d) water-rinse and dry the spinning filaments under a temperature between 100 and 130 degree Celsius heating for 3-5 minutes to form a natural cellulose fiber;
    (e) rolling soak the natural cellulose fiber with a flame retardant composition of of N-(hydroxymethyl)-3-(methoxy phosphorus acyl) such that the proportion of rolling liquid is 65%-70% and the concentration of N-(hydroxymethyl)-3-(methoxy phosphorus acyl) is 250 g/L-500 g/L;
    (f) orderly heating dry, twice baking, neutralizing, soaping clean, water rinse and baking dry the soaking rolled natural cellulose fiber, wherein the heating dry is performed under temperature at 105 degrees Celsius heating for 10 seconds,
    wherein the first bake is performed under temperature between 130 and 155 degrees Celsius, heating for 60-120 seconds;
    the neutralizing is performed in an alkaline solution with concentration of 50 g/L under temperature between 20 and 30 degrees Celsius,
    and the soaping clean is performed in an alkaline solution with concentration of 2 g/L having soaping powder concentration of 3 g/L under a temperature between 20-30 degrees for 10 seconds; and
    (g) successively alkaline clean, water rinse, dry and oil the natural cellulose fiber to produce natural cellulose fiber with long-acting flame retarding capacity, then either obtain long filament via coiling means or short staple via cutting means.

2. The fabrication process of natural cellulose fibers with flame-retarding properties of claim 1, wherein the concentration of said N-methylmorpholine N-oxide (NMMO) in step (a) is 50%-75%.

3. The fabrication process of natural cellulose fibers with flame-retarding properties as claimed in claim 1, wherein the coiling speed of the natural cellulose in step (g) is 200-600 meters per minute.

4. The fabrication process of natural cellulose fibers with flame-retarding properties as claimed in claim 1, wherein the fiber strength of the natural cellulose fiber produced in step (g) is 3.0 g/d-5.0 g/d.

5. The fabrication process of natural cellulose fibers with flame-retarding properties as claimed in claim 1, wherein the fiber elongation of the natural cellulose fiber produced in step (g) is 4.0%-8.0%.

6. The fabrication process of natural cellulose fibers with flame-retarding properties as claimed in claim 1, wherein the Young's modulus of the natural cellulose fiber produced in step (g) is 50 g/d-150 g/d.

7. The fabrication process of natural cellulose fibers with flame-retarding properties as claimed in claim 1, wherein the alkaline solution used for the soapinig clean performed in step (f) is NaOH or $Na_2CO_3$.

8. The fabrication process of natural cellulose fibers with flame-retarding properties as claimed in claim 1, wherein the alkaline solution used for the alkaline clean performed in step (g) is NaOH or $Na_2CO_3$.

9. The fabrication process of natural cellulose fiber with flame-retarding properties as claimed in claim 1, wherein the process for solvent recycling comprises the following steps:
    A. Bleaching: The bleaching process is performed by absorption of suspending active carbon with practical steps as below:
        put 0.05%-0.10% of active carbon powder with good absorptivity and suspension ability into the liquid of NMO solvent to be de-colored, then alternate an air-blast mixing with absorption and stationary suspending absorption treatments with treating time ratio between 1:3 to 1:6 for 8 hours to finish the bleaching procedure;
    B. Filtrating: The filtrating process is performed by bi-phase filtration of coarse filtering and fine filtering:
        first coarse filtering phase: with a general cartridge filter with filter aid composing of diatomite and cellulose; a filter aid is put in the solution to be filtrate with 0.3%-0.05 content other than spread over the surface of the filtering cartridge, and a minor puffing agent is also added therein;
        after completion of the coarse filtering phase, the filtering dregs and the residual liquid are centrifugal and dehydrating treated for recycling use;
        second fine filtering phase with Ultrafiltration (UF) filter;
    C. Concentrating: for low yield quantity of fiber, the tri-effect condensing method is adopted to dehydrate per ton of rinsing liquid in using 0.5 ton of steam with feature of high steam consumption but low electric power consumption or for high yield quantity of fiber, the Mechanical Vapor Recompression (MVR) condensing method is adopted to dehydrate per ton of rinsing liquid using 0.003-0.03 ton of steam with feature of low steam consumption but high electric power consumption; the yield condensed solvent and water in both foregoing condensing methods also is used completely recovered for reusing; wherein, the yield condensed solvent is recycled for reusing as processing solvent and yield condensed water is recycled for reusing to rinse fiber; and D. Refining: adopting temperature at 80 degree of Celsius (80° C.) low temperature oxidation and neutralizing reduction using 35% $H_2O_2$ as oxidant and 85% $N_2H_4.H_2O$ as neutralizing reductant, the result is measured by electric potential titrating method and the NMMO content is decreased down below 10 ppm so that not only the purity of NMMO is promoted but also the NMMO consumption is decreased.

10. The fabrication process of natural cellulose fibers with flame-retarding properties as claimed in claim 9, wherein the filtering aid composition used in step B comprises diatomite to cellulose in ratio of 4:1.

\* \* \* \* \*